(12) United States Patent
Lockhart et al.

(10) Patent No.: US 6,732,152 B2
(45) Date of Patent: May 4, 2004

(54) METHODS AND APPARATUS FOR GENERATION AND DISTRIBUTION OF SURFACE MAIL OBJECTS

(75) Inventors: John Lockhart, Cave Creek, AZ (US); Thomas Wade Bevan, Roy, UT (US)

(73) Assignee: AmazingMail, Inc., Scottsdale, AZ (US)

(*) Notice: Subject to any disclaimer, the term of this patent is extended or adjusted under 35 U.S.C. 154(b) by 0 days.

(21) Appl. No.: 09/544,005

(22) Filed: Apr. 6, 2000

(65) Prior Publication Data

US 2002/0103697 A1 Aug. 1, 2002

Related U.S. Application Data

(60) Provisional application No. 60/128,594, filed on Apr. 9, 1999, and provisional application No. 60/154,768, filed on Sep. 20, 1999.

(51) Int. Cl.[7] .............................................. G06F 13/00
(52) U.S. Cl. ........................................................ 709/206
(58) Field of Search ............................ 709/200, 206, 709/207, 232; 382/101, 176; 358/402, 462; 209/584; 229/92.1, 92.8

(56) References Cited

U.S. PATENT DOCUMENTS

| | | | |
|---|---|---|---|
| 4,797,832 A | 1/1989 | Axelrod et al. |
| 4,800,506 A | 1/1989 | Axelrod et al. |
| 5,050,078 A | 9/1991 | Sansone |
| 5,060,165 A | 10/1991 | Schumacher et al. |
| 5,072,401 A | 12/1991 | Sansone et al. |
| 5,077,694 A | 12/1991 | Sansone et al. |
| 5,109,519 A | 4/1992 | Zimmet et al. |
| 5,130,806 A | 7/1992 | Reed et al. |
| 5,202,834 A | 4/1993 | Gilham |
| 5,293,250 A | 3/1994 | Okumura et al. |
| 5,426,594 A | 6/1995 | Wright et al. |
| 5,442,567 A | 8/1995 | Small |
| 5,454,038 A | 9/1995 | Cordery et al. |
| 5,513,117 A | 4/1996 | Small |
| 5,555,496 A | 9/1996 | Tackbary et al. |
| 5,805,810 A | 9/1998 | Maxwell |
| 5,983,264 A | 11/1999 | Gardner |

FOREIGN PATENT DOCUMENTS

WO    WO 91/01608    2/1991

OTHER PUBLICATIONS

"Connecting with the unconnected", D. Audsley, Office Equipment & Methods, 1987, pp. 47–48.
"Methodology for Mail Delivery in a Multi–Media Environment", IBM Technical Disclosure Bulletin, Apr. 1993.

Primary Examiner—Robert B. Harrell
(74) Attorney, Agent, or Firm—Snell & Wilmer LLP (57) ABSTRACT

A method for generating and distributing mail items includes creating a first and a second mail file, wherein each of the first and second mail files includes recipient address information, and wherein the first mail file is generated by a first user, and the second mail file is generated by a second user. The first and second mail files are then transmitted to a mail service computer over a global computer network and printed, on a single sheet of media, a first mail item in accordance with the first mail file, and a second mail item in accordance with the second mail file. The first and second mail items are then placed into a surface mail system. The first mail item is addressed in accordance with the first recipient address information, and the second mail item is addressed in accordance with the second recipient address information. The mail item is then placed into the surface mail system in such a way as to minimize handling damage, and to leverage available postal technology. The mail items are then delivered to the postal addresses of the intended recipients.

58 Claims, 9 Drawing Sheets

FIG.1

FIG.2 amazingmail.com    Choose a  picture for your postcard...

| Home * Postcard Ideas * My Account * About Us * Help |

Use Your Own  306

Upload an Image

302 { 304 [____] [Browse]
        [Upload] — 308
(File must be JPG of 1M or less)
(300K=2mins @ 56k)
Need Help?

Online Services

Kodak PhotoNet online
If you are a kodak PhotoNet user you can access your PhotoNet account and make person postcards. Login Now!

310 {

PhotoPoint
Access your PhotoPoint account and put your photo on a postcard. Go There Now!

Free Software

312 {
Adobe ActiveShare
Adobe ActiveShare helps you organize your picture collection and send your prized photos as postcards thru AmazingMail.com. Download Now!

ez-pix
AmazingMail EZ-Pix allows you to grab, import, or drag-n-drop any image on your computer to make a postcard. Download Now!

Or One of These

Postcard Images

ArtToday

Discover Capitol Records' artist Dave Koz and view pictures he's taking during his SE Asia tour.    ArtToday provides 480,000 images ready for your postcard!

Postcard Greetings
All Greetings

Anytime Notes
Friendship | Inspirational | Thinking of You | Zodiac Signs | More Love & Romance
Loving You Birthday Wishes
For Anyone | For Him | For Her | Kids | Invitations Thank You Cards More Occasions
Baby | Engagement/Marriage | Graduation | New Home/Address
Ziggy
Animals | Car/Auto | Computers | Food Humor | Get Well/Health

[______] [Search]
                 316

} 314

About US | Privacy Practices | User Agreement | Contact Us
Give us Feedback | About Security | Affiliate Program | Friendship Freebies

METHODS AND APPARATUS FOR GENERATION AND DISTRIBUTION OF SURFACE MAIL OBJECTS

CROSS-REFERENCE TO RELATED APPLICATIONS

This application claims the benefit of U.S. Provisional Application Ser. No. 60/128,594 filed Apr. 9, 1999, and U.S. Provisional Application Ser. No. 60/154,768 filed Sep. 20, 1999, both of which are hereby incorporated by reference.

BACKGROUND OF THE INVENTION

1. Technical Field

The present invention relates, generally, to communication via surface mail and, more particularly, to methods for efficiently generating and distributing surface mail utilizing a global computer network.

2. Background Information

Despite the pervasiveness of the Internet in business and popular culture, a large number of individuals remain unable or unwilling to access the Internet. Indeed, even in the United States, which boasts by far the highest number of Internet users (approximately 100 million by recent estimates), only about a third of the population are consistently on-line. As a result, there is a widening gap between those who use e-mail as a communication tool on a day-to-day basis, and those who are unable to receive e-mail at all.

This problem is most apparent in the electronic greeting card market. While there are many organizations and websites offering the ability to transmit electronic greeting cards of one form or another to a recipient's e-mail address (or to transmit the mere notification that a card is waiting for retrieval), such systems fail to reach the vast majority of potential recipients.

As a result, systems and methods for preparing surface mail using various computer implementations have been proposed. Such methods, however, are unsatisfactory in a number of respects.

For example, it has been proposed to compose mail pieces at local computers and electronically forward those mail pieces for conversion to hard copy surface mail pieces at stations closer to the destination address than the original composing computer. Such systems fail to use a centralized mail processing facility capable of converting electronic messages to surface mail, taking advantage of bulk mailing rates, and permitting the mail service user a wide variety of creative tools and easy payment of postage.

Furthermore, known systems have been suggested to provide kiosks or other strategically-located computer installations for the creation of mail which is then communicated electronically to a central processing site for printing and mailing as surface mail, or for delivery by E-mail. In this model, the appropriate postal bar code is applied at the central location, and graphics can be applied to the mail by the customer at the kiosk either by the customer's creation or by his or her selection of available graphic files stored at the kiosk. Such services, however, are inconvenient and expensive, as the mail object cannot be conveniently created at a home PC and communicated via the Internet.

Various schemes for printing postage on hard copy mail by computer have also been proposed, but these have not been a part of an Internet mail composition and posting system or procedure. Businesses of all sizes have, in recent years, computerized many aspects of their operations, but mailings often require a manual and time consuming operation. No readily available computerized bulk mailing method has been suggested which affords reduced cost bulk mail rates to small mailings.

Personalized greeting card production has been suggested by which a computer user can choose a stored card design and add text, then forward the virtual card electronically to a card distribution center from where it can be sent by surface mail. In that arrangement, communication between the user and the card distribution center is by E-mail with the use of an "on-line service." These systems are unsatisfactory in that the card-sender has limited options as to the card's content.

Concerning the production of images in electronically produced mail, the electronic production of a printed picture postcard juxtaposing a self portrait of the user with other imagery has been suggested, all created at a photo booth. However, the proposed system does not contemplate a computer user being able to capture an image available on his or her computer for use on a mail object being composed-to be delivered electronically to a central location for printing and posting.

In the past, creative composition of mail items such as direct mail advertisements has required the time consuming cooperation of the artist, copywriter, and printer to produce custom pieces. For many businesses, the cost is prohibitive. Conversion of a computer generated custom mail piece directly to hard copy mail either for individual recipients or bulk mailing would be an attractive alternative to the current process for both businesses and individuals.

Methods are therefore needed in order to overcome these and other limitations of the prior art. More particularly, there is a long-felt need for systems which allow a user to cost-effectively create and distribute individualized mail items such as postcards using an easy-to-use computer interface available over a global computer network.

BRIEF SUMMARY OF THE INVENTION

This summary of invention section is intended to introduce the reader to aspects of the invention and is not a complete description of the invention. Particular aspects of the invention are pointed out in other sections hereinbelow, and the invention is set forth in the appended claims which alone demarcate its scope.

The present invention provides systems and methods which overcome the shortcomings of the prior art. In accordance with one aspect of the present invention, a method for generating and distributing mail items includes the steps of creating a first and a second mail file, wherein each of said first and second mail files includes recipient address information, and wherein said first mail file is generated by a first user, and said second mail file is generated by a second user; transmitting said first and second mail files to a mail service computer over a global computer network; printing, on a single sheet of media, a first mail item in accordance with said first mail file, and a second mail item in accordance with said second mail file; and placing said first and second mail items into a surface mail system, wherein said first mail item is addressed in accordance with said first recipient address information, and said second mail item is addressed in accordance with said second recipient address information.

In this way, a user can cost-effectively create and distribute individualized surface mailings using an easy-to-use computer interface available over the Internet.

BRIEF DESCRIPTION OF THE SEVERAL VIEWS OF THE DRAWINGS

The subject invention will hereinafter be described in conjunction with the appended drawing figures, wherein like numerals denote like elements, and.

DETAILED DESCRIPTION OF PREFERRED EXEMPLARY EMBODIMENTS

Systems and methods in accordance with various aspects of the present invention provide for the cost-effective creation and distribution of customized mail items using an easy-to-use computer interface available over a global computer network. In this regard, the present invention may be described herein in terms of functional block components, standard symbology, network diagrams, and various processing steps. It should be appreciated that such functional blocks may be realized by any number of hardware and/or software components configured to perform the specified functions. In addition, those skilled in the art will appreciate that the present invention may be practiced in any number of data communication contexts and that the various systems described herein are merely exemplary applications for various aspects of the invention. Further, it should be noted that the present invention may employ any number of conventional techniques for data transmission, training, signal processing and conditioning, and the like. Such general techniques that are known to those skilled in the art are not described in detail herein.

I. SYSTEM OVERVIEW

Figure 1:
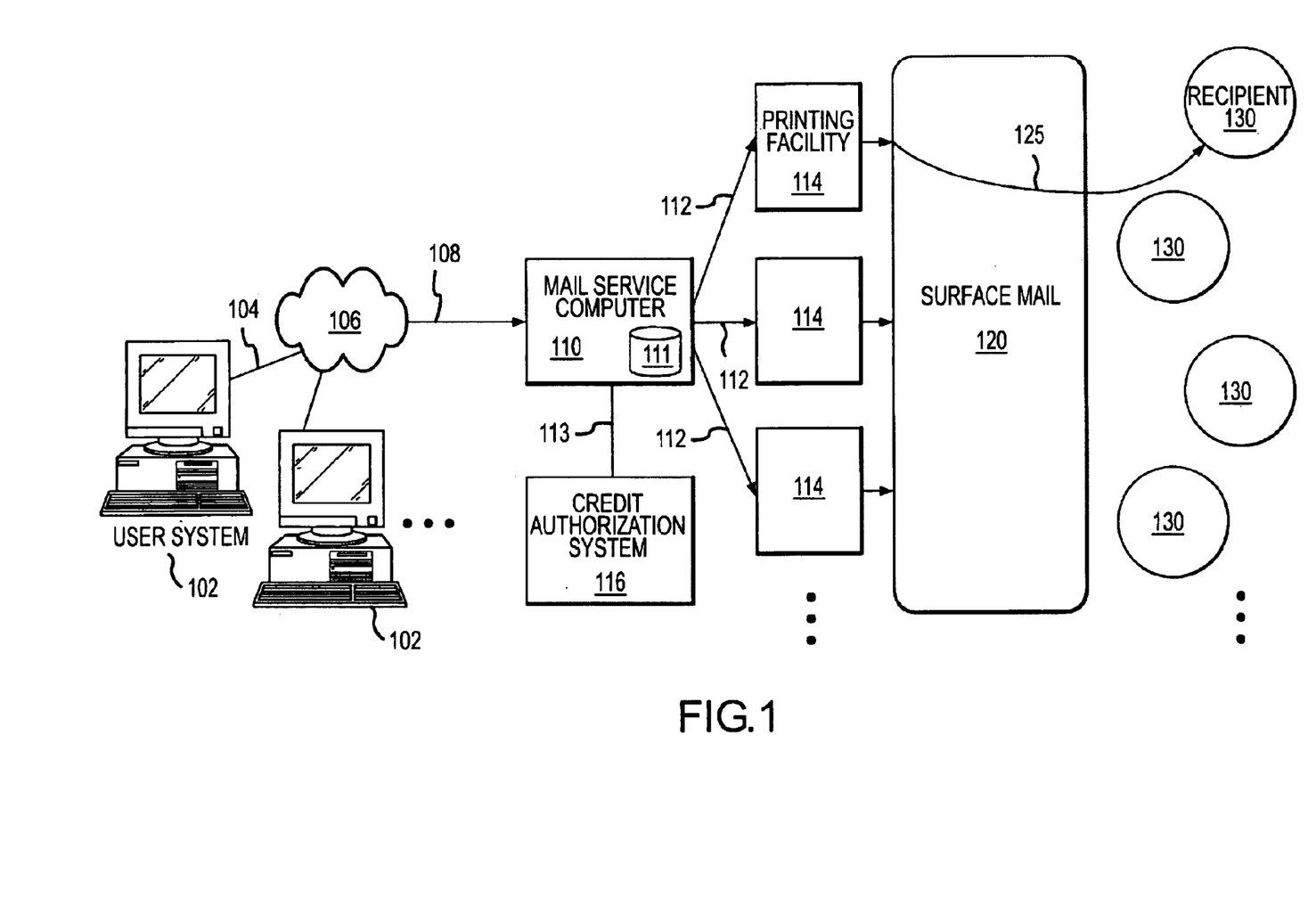
FIG. 1 is a schematic block diagram depicting an overview of various aspects of the present invention.

Referring now to FIG. 1, a system in accordance with the present invention generally comprises one or more user systems 102 connected via respective data links 104 to a global computer network, 106. Network 106 (e.g., the Internet) communicates with a mail service computer 110, which in turn is connected via data links 112 to one or more printing facilities 114. The output of printing facilities 114 (e.g., postcards and the like) enter surface mail 120 and are thereby delivered to recipients 130 at their respective addresses. Mail service computer 110 also preferably communicates with a credit authorization system 116 over a data link 113.

In general, and as detailed further below, a user utilizes suitable software residing on, or temporarily provided within, user system 102 to specify the contents of an electronic mail file intended for a particular recipient 130. This software may include, for example, a web browser, or might include stand-alone client software. The mail file, which is preferably assembled within mail service computer 110, comprises various components such as text, graphics, address information, and other data as may be appropriate given the particular mail item to be produced. The user, acting through a user interface provided by software residing on the user system 102, communicates with mail service computer 110 through data link 104, network 106, and data link 108 in order to specify the components of the mail file. Alternatively, various components of the mail file, e.g., an image to be placed on the mail item, can be created on user system 102 and transferred to mail service computer 110.

Mail service computer 110 processes the mail file and then sends the file to one of the printing facilities 114 in accordance with scheduling details specified by the user. Printing facility 114 processes and prints the mail file information—including static data (template information), variable text data, and variable image data—to produce a physical mail item. The physical mail item might include, for example, a postcard, letter, folding-out card, or the like. In accordance with one aspect of the present invention, printing facility 114 is configured to efficiently and cost-effectively handle a large volume of variable text and graphics.

The mail item is then advantageously placed into the surface mail system 120 (e.g., the U.S. Postal Service) in such a way as to minimize handling damage, and to leverage available postal technology as set forth in detail below. The mail item is then delivered (125) to the postal address of intended recipient 130.

Having thus given an overview of the present system, the various components will now be described in detail, followed by a detailed description of an exemplary manner of operation.

A. User Systems

User systems 102 may include any convenient combination of hardware and software components configured to allow a user to communicate with mail service computer 110, and to create, display, and optionally transfer various components of the mail file over network 106. For example, user system 102 might include a standard personal computer (PC) comprising a CPU, monitor, storage, keyboard, mouse, and communication hardware appropriate for the given data link 104 (e.g., V.90 modem, network card, cable modem, etc.).

As one aspect of the present invention relates to the creation of custom mail items based on the user's own graphics, user system 102 might also include one or more peripheral devices such as a scanner, a digital camera, a motion video camera, a TV Tuner card, or the like. User system 102 also preferably includes application software configured to communicate over network 106 with Mail Service Computer 110, for example, a WWW browser such as Netscape Navigator, Microsoft Internet Explorer, or any other present or future communication software which operates in accordance with the HTML and HTTP protocols.

In addition to suitable communication software, user system 102 may also include client software which allows the user to select regions of the displayed image for inclusion in the mail file and, ultimately, the printed mail item. In an alternate embodiment, this functionality is provided by a suitable applet (e.g., a Java applet) which is downloaded and executed over the network when necessary. Details of this process are covered below.

As those skilled in the art will appreciate, user system 102 will typically include an operating system (e.g., Windows 95/98/2000, Linux, Solaris, etc.) as well as various conventional support software and drivers typically associated with computers.

In an alternate embodiment, user system 102 is a personal data assistant (PDA) capable of manipulating images and communicating with Mail Service Computer 110. In yet another embodiment, user system 102 is a kiosk located, for example, at a mall, theme park, airport, or any other location from which a user might wish to send a mail item to a recipient 130.

Alternatively, the image data may reside on another server, e.g., a web server, and that data can be transferred to mail service computer 110 at the user's request without the data actually originating from or passing through user system 102.

B. The Network

A variety of conventional communications media and protocols may be used for data links 104, 108, and 112. Such links might include, for example, a connection to an Internet Service Provider (ISP) over the local loop as is typically used in connection with standard modem communication, cable modem, Dish networks, ISDN, Digital Subscriber Line (xDSL), or various wireless communication methods. User system 102 might also reside within a local area network (LAN) which interfaces to network 106 via a leased line (T1, DS3, etc.).Such communication methods are well known in the art, and are covered in a variety of standard texts. See, e.g., GILBERT HELD, UNDERSTANDING DATA COMMUNICATIONS (1996), hereby incorporated by reference.

As the present invention is best deployed in the context of a large user-base, network 106 as depicted in FIG. 1 preferably corresponds to the Internet. As used herein, the term "Internet" refers to the global, packet-switched network utilizing the TCP/IP suite of protocols. Nevertheless, the present invention may be implemented in other network contexts, including any future alternatives to the Internet, as well as other suitable "internetworks" based on other open or proprietary protocols.

Specific information related to the protocols, standards, and application software utilized by in connection with the Internet will not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLANED (1997). All of these texts are hereby incorporated by reference.

C. Mail Service Computer

Mail service computer 110 comprises any number of hardware, software, and networking components necessary to receive and process mail items. In addition, mail service computer 110 provides a suitable website or other Internet-based graphical user interface which is accessible by users, and which provides the functionality described in further detail below. In one embodiment, Sun Ultra SPARC Enterprise 250 and 450 servers are used in conjunction with the Sun Solaris 7 operating system, Apache web server software, and an Oracle 8 database system.

The term "web page" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

D. Printing Facility

Printing facility 114 includes any combination of suitable hardware and software components configured to receive mail file information from Mail Service Computer 110 and produce a corresponding hard-copy mail item. In this regard, printing facility 114 preferably includes a high-speed, high-resolution printer which can print JPEG images at what is generally known as "press speed." It will be appreciated that while the various printing facilities are illustrated as being separate from mail service computer 110, the printers and mail service computer may be located within the same general area. Printing facility 114 also includes suitable computer hardware and software configured to store, transfer, and create hard-copy output based on the incoming mail files.

E. Surface Mail

Surface Mail 120, which is depicted conceptually in FIG. 1, provides for physical delivery to recipients 130 of mail items produced by printing facilities 114. In this regard, a variety of land and air delivery schemes may be used. In a preferred embodiment, surface mail 120 corresponds to the U.S. Postal Service. A particular recipient 130 may be any individual or group located in the U.S. or internationally which has a specified postal address or post office box number.

Applicable U.S. Postal regulations can be found in the Domestic Mail Manual (DMM), Issue 54, Sep. 9, 1999, available from the U.S. Postal office, which is hereby incorporated by reference. The DMM includes such topics as addressing, deposit, collection, delivery, mail preparation and sortation, and other details of U.S. mail delivery.

The manner in which the surface mail is utilized to accomplish the objects of the present invention is described further below.

II. PROCESS FLOW

Figure 2:
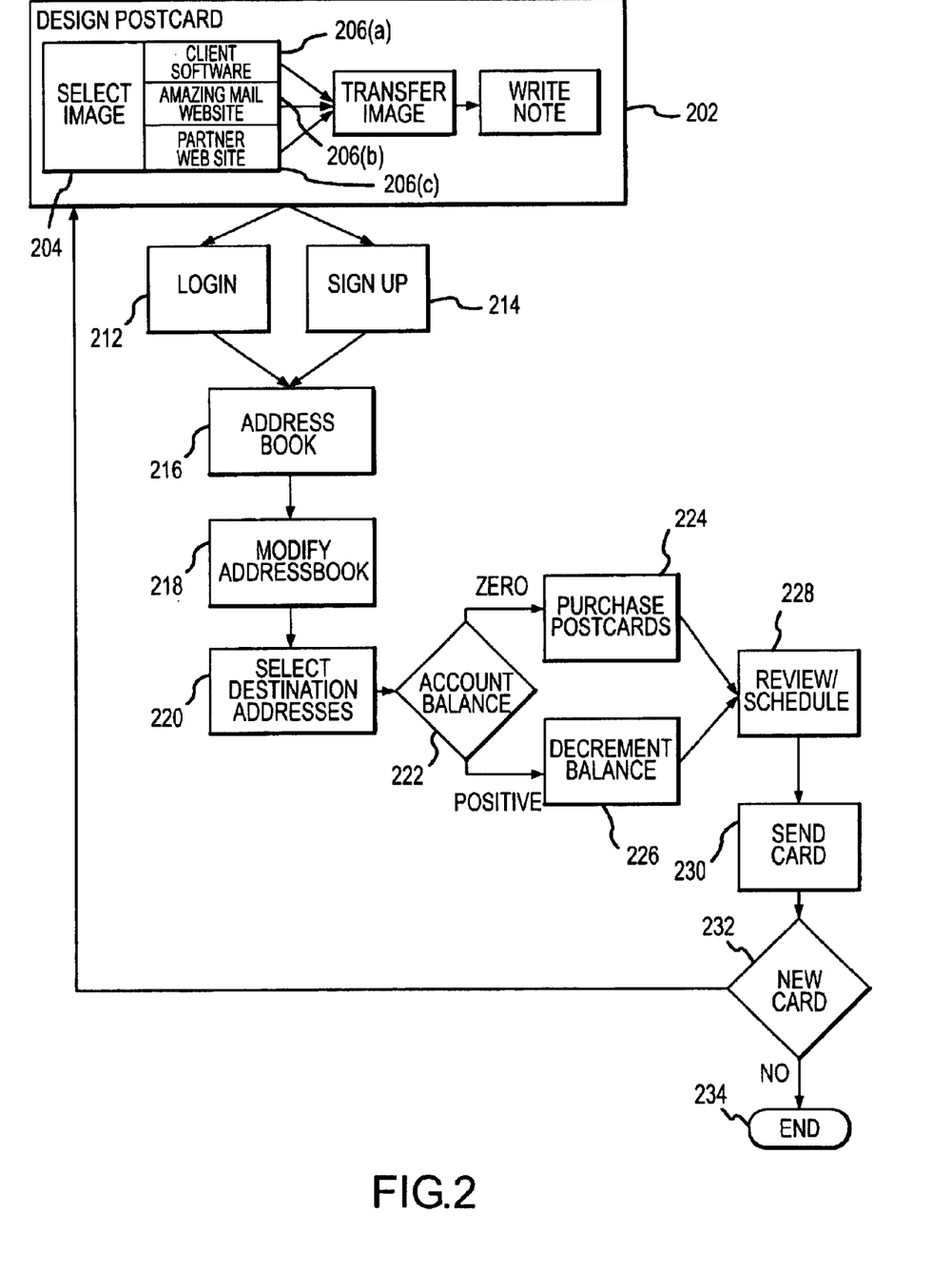
FIG. 2 is a flowchart summarizing a processing method in accordance with one embodiment of the present invention.

Referring now to FIGS. 1 and 2, an exemplary method in accordance with the present invention will now be described in detail. It should be understood that the exemplary process illustrated may include more or less steps or may be performed in the context of a larger processing scheme. Furthermore, the various flowcharts presented in the drawing figures are not to be construed as limiting the order in which the individual process steps may be performed.

A. Mail File Creation and Transfer

First, in step 202, the user designs the postcard. In the illustrated embodiment, this step comprises a number of substeps. In step 204, the user selects an image to be displayed on the mail item. This selection may be accomplished in a variety of ways. For example, in step 206(*a*), the user employs one or more special-purpose client software modules residing on the user's system. In general, as will be described further below, this client software would generally allow an image to be imported through the menu, dragged-and-dropped into the application window, and/or captured as a screen image.

Alternatively, in step 206(*b*), the user suitably accesses a server associated with mail service computer 110 which includes a plurality of graphical images that the user may select, e.g., by browsing and clicking on thumbnail versions of the images displayed on a web page. In yet another alternative, a partner server or web site includes graphical images which can be selected by the user and transferred to mail service computer 111 (step 218) through a hyperlink and/or button. Where appropriate (i.e., when the image does not already reside on the mail service computer) the selected image is transferred to mail service computer in step 208 and suitably displayed to the user, e.g., by launching a web browser (if no such browser is currently active).

Figure 3:
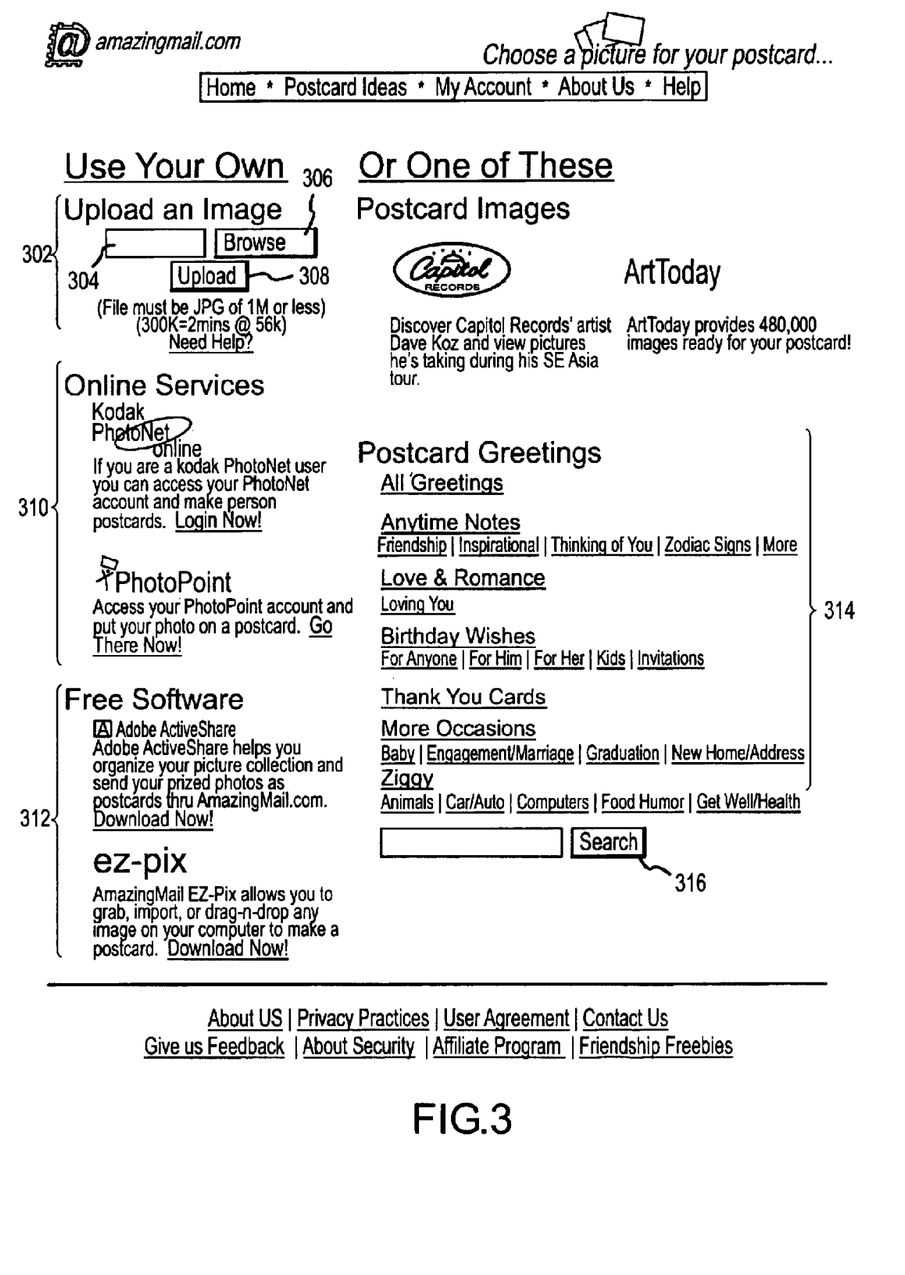
FIG. 3 shows an exemplary web page for selecting an image in accordance with the present invention.

In order to organize the image-selection options in a way that is intuitive to the user, a web page such as that shown in FIG. 3 may be provided. In this example, a region 302 is shown for uploading an image (described below), along with links to various online services 310, links to client software 312, and links to on-line sources of content (which may include an image search engine 316).

Image Collections/ Partner Web Sites

In general, in the case where the user wishes to create a post card incorporating one or more graphics based on an online clip-art collection, a postcard showcase, or a photo collection, the appropriate graphical elements are stored at any convenient site accessible to the user over network 106. For example, the images may be located in a database 111 or other storage medium associated with mail service computer 110. Alternatively, the graphics may be distributed over a number of databases or vendors accessible over network 106. The images may be stored in a variety of image formats and, if necessary, converted to a format suitable for use in connection with the mail file being created. Such image formats include, for example, JPEG, BMP, PICT, EPS, and the like. In a preferred embodiment, the images are stored or converted to JPEG format in order to preserve bandwidth.

In another embodiment, the graphic selection process is hosted by a partner site. An image (e.g., a JPEG image) is produced by them and passed to us via a convenient protocol (preferably HTTP). The user then completes the mail item in the normal course as described above. A web site in accordance with another aspect of the present invention could be displayed in a frame within another site, allowing shopping cards and co-branded cards to be included.

A banner advertisement may be placed on a partner's site to allow click-throughs/and purchases to be tracked. The resulting revenue can then be shared in accordance with a mutually agreeable formula, e.g., 40% of the first sale, and 10% of recurring revenue over a given time period.

Image Push Requirements

A server-to-server specification is preferably adhered to by partners who deliver image content for placement on a mail item. In general, an image is 'pushed' to the mail service computer during the image selection process. This may be accomplished using a variety of methods, for example, by using a uniform resource locator (URL) having the following format:

http://www.amazingmail.com/cgi-bin/getimage.cgi?IMAGE=imagepath/filename&PIC=partner_num&SOURCE=promotion_code where www.amazingmail.com is the web site associated with the mail service computer, image_path is the full path and filename of the image on the partner's server, partner_num is the pre-assigned partner identification number, and promotion_code, which may be optional, is an identification code representing a partner-sponsored promotion.

Client Software

In the case where the user wishes to use his own graphic for the postcard using client software (step 206(*a*)), a variety of methods may be used.

In the preferred embodiment, the user is allowed to upload an image using a web interface (e.g., region 302 of the exemplary web page shown in FIG. 3). That is, the user clicks on a "Browse" button 306 to select a graphical image (e.g., a JPG image) that resides on the user system hard drive or network neighborhood. The user then initiates uploading the image (button 308), and the image data is transferred to mail service computer 110. Such methods for uploading files are known in the art.

In another embodiment, a stand-alone application resides on user system 102 which allows all or part of the display to be captured and incorporated into the postcard. Such software may be downloaded, for example, at the web site provided at mail service computer 110.

Figure 5:
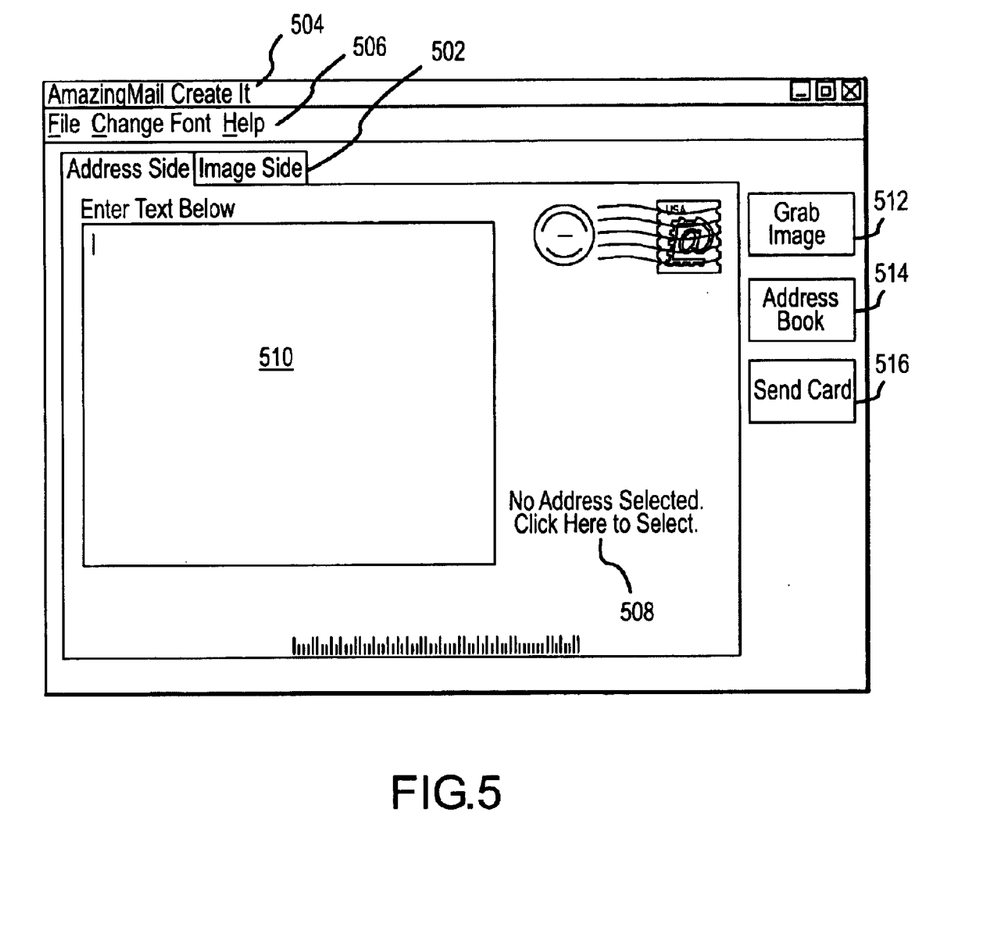
FIG. 5 shows an exemplary application window allowing address information to be entered.
Figure 6A:
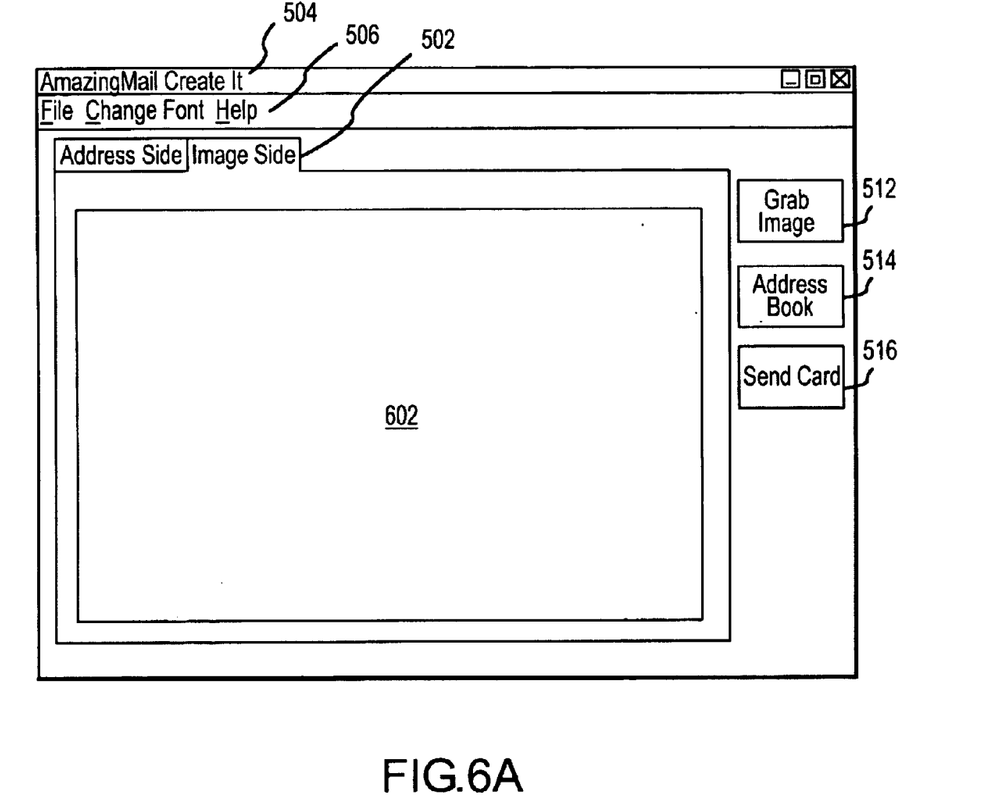
FIG. 6A shows an exemplary application window displaying a blank image field.
Figure 6B:
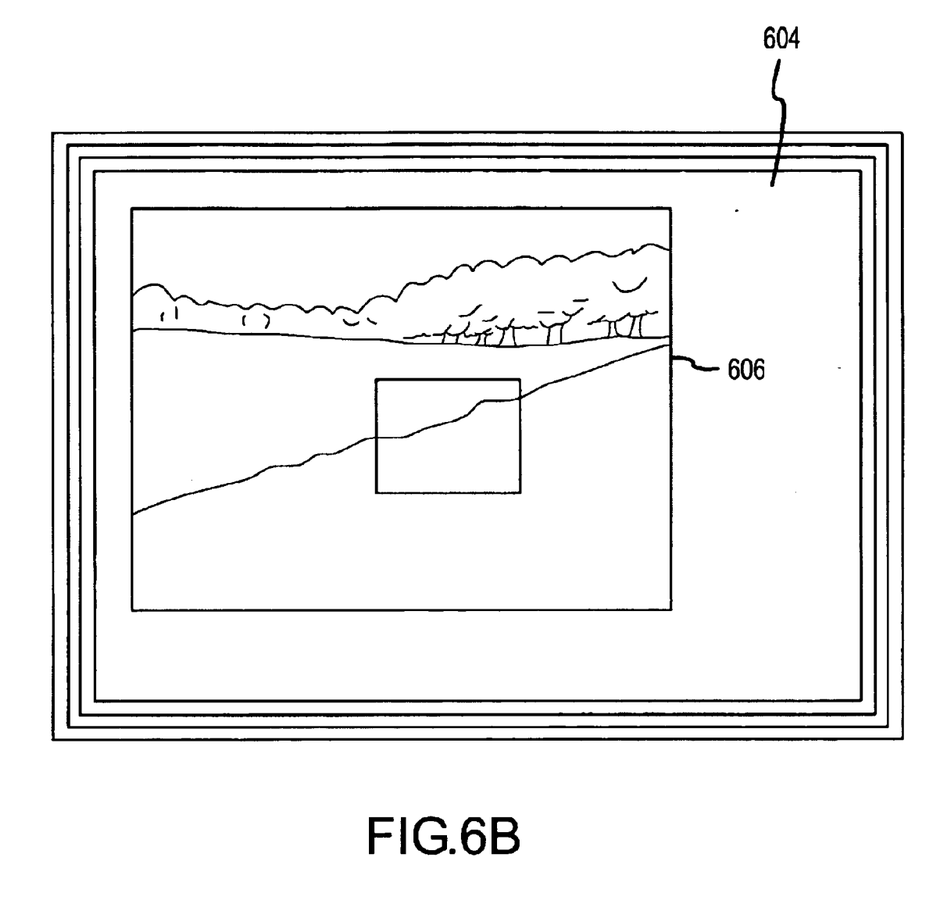
FIG. 6B shows the selection of a rectangular portion of a graphic image in accordance with an exemplary embodiment.

More particularly, referring now to FIGS. 5, 6A, and 6B, an application is executed by the user, or is automatically executed when the "user's image" icon is clicked, such that address and image information may be entered and transmitted to the mail service computer. As shown, a window 502 is displayed which allows the user to select between an "address side" tab and an "image side" tab. The window initially contains no image or text information. Address information can be entered by clicking address region 508, and a text note can be entered within window 510. Buttons are displayed to allow grabbing an image (512), accessing the address book (514), and sending the card (516) after all required data has been entered.

When the "Image Side" tab 506 is selected, the window, as shown in FIG. 6A, displays a blank region 602 which will receive the image. At this point, the user clicks the "Grab Image" button 512. A prompt is then preferably displayed which instructs the user to select a region on the monitor's screen (e.g., the message "Find the image you want, and click 'Grab'" accompanied by a "Grab Image" button and a "Cancel" button). Once the user selects the "Grab" option, the window is preferably closed to allow the full screen to be viewed without obstruction.

Referring to FIG. 6B, the user selects a region 610 within display 604 which includes the desired image. In a paradigmatic case, the user may be working with an image manipulation program such as Adobe Photoshop, Corel Draw, or the like, wherein a photograph 606 is displayed. The user then chooses region 610 by defining a boundary 608 around the desired array of displayed pixels. In the illustrated embodiment, the user defines an arbitrary rectangular region by dragging the mouse in the conventional manner; i.e., by clicking on a first corner 612, then moving the mouse to a second corner 614 while holding down the mouse button. While a rectangular boundary 608 is shown here, other shapes may employed, e.g., elliptical, polygonal, or any other closed curve. The aspect ratio or other geometrical indicia of boundary 608 may be constrained, for example, to match the aspect ratio of the finished postcard. Similarly, input devices other than a mouse may be employed.

After region 610 is defined, the application suitably accesses the video memory region corresponding to this region. As will be appreciated, the bit depth and resolution of the resulting image will primarily depend upon the display settings and graphic card employed in the user's system. In a typical system, the true resolution of the image will be about 72 or 96 dpi; however, the present invention contemplates greater or lesser resolution.

As it may be desirable to increase the effective image resolution on the finished mail item, the selected image may be resampled and/or scaled to provide higher resolution. That is, region 610 may be displayed as 280 mm×192 mm, but may be reduced to a 140 mm×96 mm image (with the same pixel count) on the finished mail item, thus effectively doubling the resolution. In this regard, it may be appropriate to employ smoothing, interpolation (e.g., bicubic interpolation), or other filtering methods to produce the final image file.

In another embodiment, an applet, such as a Java applet, is incorporated into the accessed web site to provide the functionality detailed above. That is, the applet itself provides the interface by which the user may select the desired graphic. The Java Native Interface (JNI) is used in conjunction with suitable DLL file techniques in order to access the video memory. See, e.g., ESSENTIAL JNI by Rob Gordon; The JAVA NATIVE INTERFACE: PROGRAMMER'S GUIDE AND SPECIFICATION (Java Series) by Sheng Liang, which are hereby incorporated by reference.

The latter embodiment is advantageous in that it allows the web page to display the graphic very quickly. As the graphic is a local file residing on the local hard drive with a known uniform resource locator (URL), the web page displaying the postcard can read the file much more quickly than it could if the image file required transfer over the typical Internet connection. Hence, the user's experience is significantly enhanced.

Themes

In accordance with another aspect of the present invention, the user is provided with a number of "themes" or "mattes" to choose from. Such a theme might comprise images, text (e.g., JPEG representations of text), and/or other elements which are to appear on the front and/or back of the mail item. For example, in the case of a baby announcement, the user may want to incorporate a festive, baby-themed border in addition to the text and photo. In such a case, a suitable file (e.g., a JPEG file) is created for display and printing. In this case, a "picture" of the text and background is suitably sent to the printing facility 114 (i.e., rather than an ASCII file). This increases flexibility with respect to fonts, point sizes, colors, backgrounds (e.g., picture of a sticky-note, parchment roll, Christmas border, and the like).

Drag-and-Drop

In accordance with another aspect of the present invention, the image acquisition software is implemented using "drag-and-drop." That is, user can drag an appropriate image (e.g., JPEG or BMP) from their file system or browser right onto an application icon residing on the desktop. This may also be implemented by the use of an applet, Active-X control, or the like which runs in the browser window and includes drag-and-drop functionality. This image is then displayed as described above, but the image is preferably sent to the mail service computer at the original resolution. This gives the user the option of sending a higher resolution image than would typically be possible.

Private Media

The user may also use "private media" in order to create the mail item. More particularly, the user may store graphics on mail service computer 110 (or another convenient system), and then access those images later for incorporation into a mail item, perhaps repeatedly. In one embodiment, the user is presented with a menu of available private images—preferably in the form of thumbnails—which may be selected for the image portion of the mail item. For example, a list of the most recent images selected by the user (e.g., five images,) may be displayed. The number of listed images would likely depend on the amount of disk space allotted to the particular user. In another embodiment, a user is allowed to scan a local disk drive for available image files. In an alternate embodiment, multiple users may collaborate to create a mail item. For example, two or more users may jointly select and/or create the various components of the mail item. The users may contribute to the mail item at the same time (e.g., by accessing a web site contemporaneously), or sequentially.

Other Methods

It will be appreciated that the image selection methods described above do not exhaust the entire range of graphical sources comprehended by the present invention; those skilled in the art will recognize that the invention is not so limited. In general, an image may be selected via any suitable method and from any convenient media, e.g. through video image capture, digital camera snapshots, scanners, and the like.

B. Text Note

Figure 4:
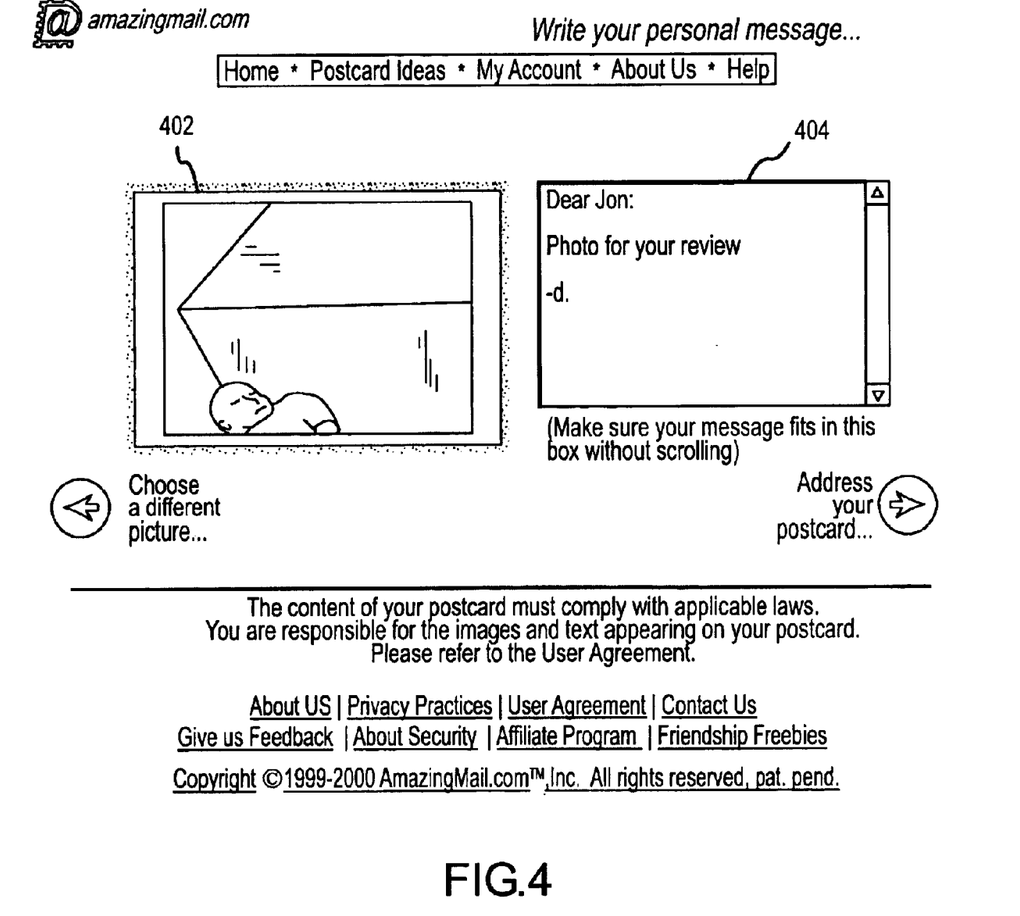
FIG. 4 shows a web page displaying the selected side-by-side with a text box for entering a message.

In Step 210, the user is prompted to enter a text note to be included on the card. As detailed above, this step may be performed by the stand-alone application used to "grab" the image. In a preferred embodiment, this step is performed through a web interface. That is, referring to FIG. 4, the image 402 and text box 404 of the postcard in progress is displayed. Text box 404 is provided within the web page to allow user input. As shown, the text area is preferably scrollable to allow longer messages to be included. Suitable "back" and "forward" are included for redoing the previous step and advancing to the next step respectively. Such icons are convention in web pages, and will not be discussed in detail. The user may be allowed to vary the font type, size, color, style, or other indicia of the text message.

C. Login/Sign-up

After the postcard has been designed (step 202), the user logs in to mail service computer 110 (step 212) or, if the user is not a member, signs up for the service (step 214). In the illustrated embodiment, this step involves accessing the home page or other appropriate page residing within a WWW server residing on mail service computer 110. Alternatively, this functionality may be distributed; i.e., the web page might reside on a different computer in a different location than mail service computer 110.

Login preferably involves entry by the user of a user name and password previously acquired during a conventional registration process. This login step may be performed using stored password and user name information, thereby streamlining the process for the user.

Once the user logs in, a page is preferably displayed which summarizes the user's account, for example, the number of available stamps or "postcards." It should be understood that the term "postcard" as used herein is not meant to limit the range of mail items which can be created and distributed using the present invention.

D. Addressing

After entering the note and moving forward, the user selects the address of the desired recipient 130 (steps 216–220). This is preferably accomplished using an address book scheme, wherein the user is presented with an address book (step 216), which may be augmented or otherwise modified (step 218), and from which the user may select one or more desired addresses (step 220). In a preferred embodiment, the displayed address book includes a number of entries which may be selected via a standard checkbox. Each entry details the name (first and last), organization (if applicable), and postal address of the potential recipient. "Action" links are preferably provided to allow the user to edit or delete each particular entry. Furthermore, the address book is preferably segmented into groups or subsets (e.g., personal, professional, etc.).

Web-based Mail Merge

In accordance with another aspect of the present invention, a web-based mail merge may be employed in connection with the creation of post cards and other mail items. That is, variable text or other variable data (addresses, names, etc.) is merged into static information to produce the final mail item. For example, a single card design may be used for a variety of recipients, wherein the first name of the recipient is imported from a merge data file (residing, for example, on the user's system, the mail service computer 110, or any other convenient location) and incorporated into the final mail item's text note.

Secure Address Changes

As described above, the user may use an address book to add the recipient address to the postcard or other mail file. In this regard, the manner in which an individual must notify a postal service (e.g., the USPS) of an address change is both unsecure and time-consuming. More particularly, the individual typically fills out and signs a form and mails it to the USPS. The USPS then sends the individual another form requesting further information (old address, new address, timing of change, etc.). This process is unsecure in that it requires only a signature (which may be forged) and is time-consuming and susceptible to error.

In accordance with one aspect of the present invention, an address-change form is supplied to the user on-line. The information is then suitably validated, for example, by using credit card information and address data previously received from the user. If the information is valid, the form data is then transmitted to the post office data center for update. If the information is not valid, an appropriate error message is generated and communicated to the individual. Once updated, the new address information can then be transmitted to friends, family, and others via email.

Browser-enabled E-mail

As client-based e-mail systems are gradually being phased out, a further aspect of the present invention combines the present system with a browser-enabled e-mail system (e.g., Hotmail, Juno, etc.). Such services offer contact managers and reminder services. Once a user has keyed all of this information into the contact list, the "switching cost" associated with changing over to another e-mail service is quite high. If a system in accordance with the present invention were incorporated as one more feature in browser-enabled E-mail, higher retention of users would result. That is, users would have a single place from which to send all communications.

E. Account Balance/Postcard Purchase

In step 206, after the recipient address for the mail item is selected, the user's account balance is accessed by the system. Such data might reside at mail service computer 110 or any convenient server. If the account balance is positive, the balance is decremented in accordance with the postage required for the mail item being sent (step 226). If the account balance is zero, or less than the required postage, then the user is provided the opportunity to purchase postcards or other mail items on-line. Depending upon the particular embodiment, the user may be able to purchase an arbitrary amount of postcards. Or the user may be presented with a choice of discrete quantities (1, 10, 25, etc.). In any event, the user is then prompted for suitable charge or debit card information, after which the user can confirm the purchase. The charge or debit is preferably authorized in conjunction with the appropriate credit authorization system 116 (for example, Visa, Mastercard, etc.).

F. Final Review/Scheduling

Figure 7:
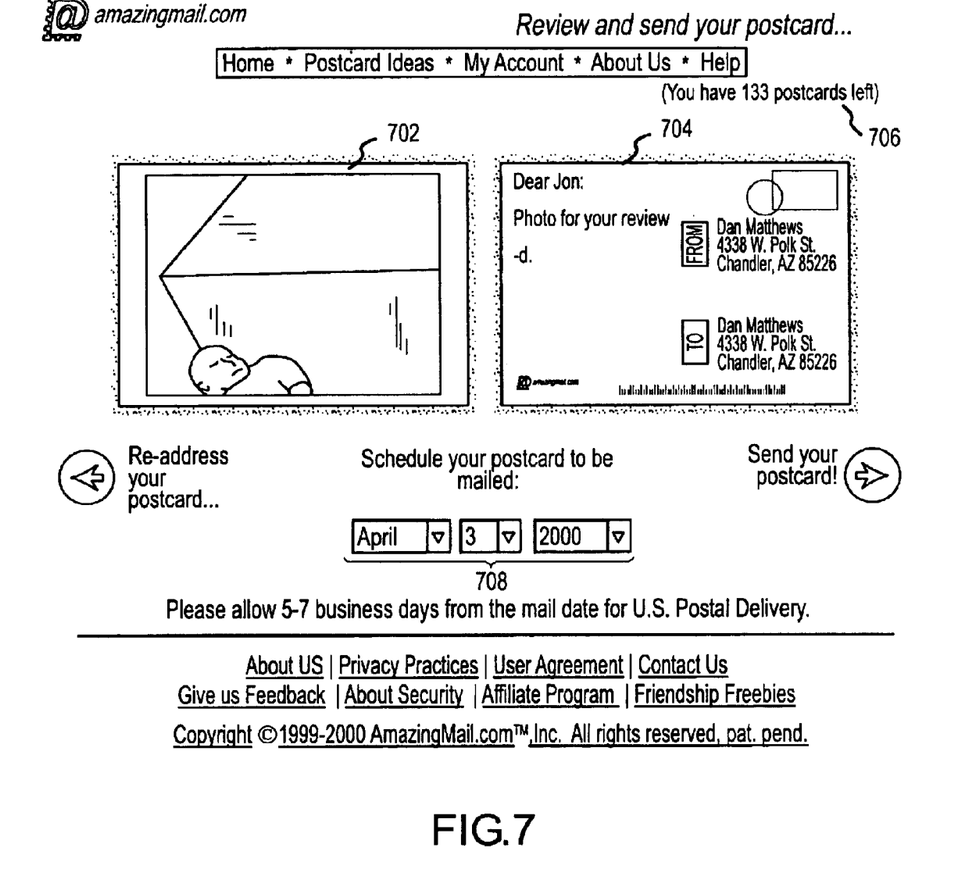
FIG. 7 shows an exemplary web page displaying a postcard in progress and scheduling of mailing date.

Once the recipient address is entered, the user is allowed to review the final postcard and schedule its delivery date. More particularly, referring to FIG. 7, the front 702 and back 704 of the intended postcard is displayed for review. The number of remaining postcards is displayed (706), and a scheduling region 708 is displayed to specify the date on which the mail item will be placed into surface mail system 120. Scheduling region 708 preferably includes pull-down menus for month, day, and year.

After suitably sending the card (step 230, described in detail below), the user is presenting with the option of creating a new card (step 232). If another card is desired, the process is repeated starting with step 202; If not, the process ends (step 234).

G. Printing and Sending the Mail Item

On or prior to the send date, the mail file associated with the postcard is sent to a printing facility 114 over data link 112. The date and time at which the file is sent and actually printed may depend on a number of factors. For example, it is likely that a large number of cards would be scheduled for send on or around December 25th. In such a case, it is advantageous to print the associated mail items prior to this date and store them for later delivery via surface mail system 120. Mail service computer 110 preferably validates the destination address by utilizing standard address correction software available from the U.S. Postal Office, e.g., any of the various "CASS" software systems. In one embodiment, the address is verified using an appropriate verification database (e.g., NCOA) which would check to ensure that the recipient address is correct, and notify the sender accordingly.

In the event that more than one printing facility 114 is used, the selection of an appropriate printing facility for a given mail file may be made based upon various selection criteria. In a preferred embodiment, the selection of printing facility is based substantially upon the a consideration of capacity available of the individual printing facilities 114. Thus, if a particular printing facility 114 has a lower number of scheduled mail items, and/or if a particular printing facility 114 includes a more advanced, faster printer, mail service computer 110 would transfer the mail file to that printing facility 114.

Example Mail File Components

The mail file itself may comprise a variety of components in any convenient format. In a preferred embodiment, the mail file includes static data and variable data. The static data includes portions of the finished mail item which does not change significantly from card-to-card (e.g., template information, logos, postage information, and the like). In contrast, variable data includes components which are specific to an individual card, such as graphic data, destination address, and note text. In a preferred postcard embodiment, wherein the mail item is approximately 152 mm×108 mm, the variable data is formatted as a comma-delimited list populated in accordance with Table 1 below.

TABLE 1

Example Template Specification

| Side | Element Name | Channel | X | Y | Width | Height | Font | Size | Color |
|---|---|---|---|---|---|---|---|---|---|
| Text | Sender Company Name | Text | 6 mm | 3 mm | 84 mm | 3 mm | Helvetica | 6 | Black |
| Text | Return Address | Text | 6 mm | 6 mm | 84 mm | 3 mm | Helvetica | 6 | Black |
| Text | Addressee 1 | Text | 95 mm | 69 mm | 50 mm | 4 mm | Helvetica | 9 | Black |
| Text | Addressee 2 | Text | 95 mm | 74 mm | 50 mm | 4 mm | Helvetica | 9 | Black |
| Text | Street 1 | Text | 95 mm | 79 mm | 50 mm | 4 mm | Helvetica | 9 | Black |
| Text | Street 2 | Text | 95 mm | 84 mm | 50 mm | 4 mm | Helvetica | 9 | Black |

TABLE 1-continued

Example Template Specification

| Side | Element Name | Channel | X | Y | Width | Height | Font | Size | Color |
|---|---|---|---|---|---|---|---|---|---|
| Text | City State Zip | Text | 95 mm | 89 mm | 50 mm | 4 mm | Helvetica | 9 | Black |
| Text | Postcard Number | Text | 125 mm | 18 mm | 20 mm | 3 mm | Helvetica | 6 | Gray |
| Text | Postnet Code | Text | 46 mm | 98 mm | 100 mm | 6 mm | Postnet | 18 | Black |
| Text | Text | Text | 6 mm | 18 mm | 84 mm | 75 mm | Arial | 10 | Black |
| Text | Text | Text | 6 mm | 18 mm | 84 mm | 75 mm | Bookman | 12 | Black |
| Text | Text | Text | 6 mm | 18 mm | 84 mm | 75 mm | Century | 14 | Blue |
| Text | Text | Text | 6 mm | 18 mm | 84 mm | 75 mm | New Cen | 10 | Green |
| Text | Text | Text | 6 mm | 18 mm | 84 mm | 75 mm | Time Ro | 12 | Black |
| Text | Text | Text | 6 mm | 18 mm | 84 mm | 75 mm | Comic | 16 | Red |
| Text | Text | Text | 6 mm | 18 mm | 84 mm | 75 mm | Copplerp | 10 | Black |
| Text | Text | Text | 6 mm | 18 mm | 84 mm | 75 mm | Elephant | 14 | Blue |
| Text | Text | Text | 6 mm | 18 mm | 84 mm | 75 mm | Felix | 10 | Black |
| Text | Text | Text | 6 mm | 18 mm | 84 mm | 75 mm | Lucida | 12 | Blue |
| Text | Text | Text | 6 mm | 18 mm | 84 mm | 75 mm | Matisse | 16 | Green |
| Text | Text | Text | 6 mm | 18 mm | 84 mm | 75 mm | Palace | 20 | Black |
| Image | Image | Image | 6 mm | 6 mm | 140 mm | 96 mm | NA | NA | NA |

Figure 8:
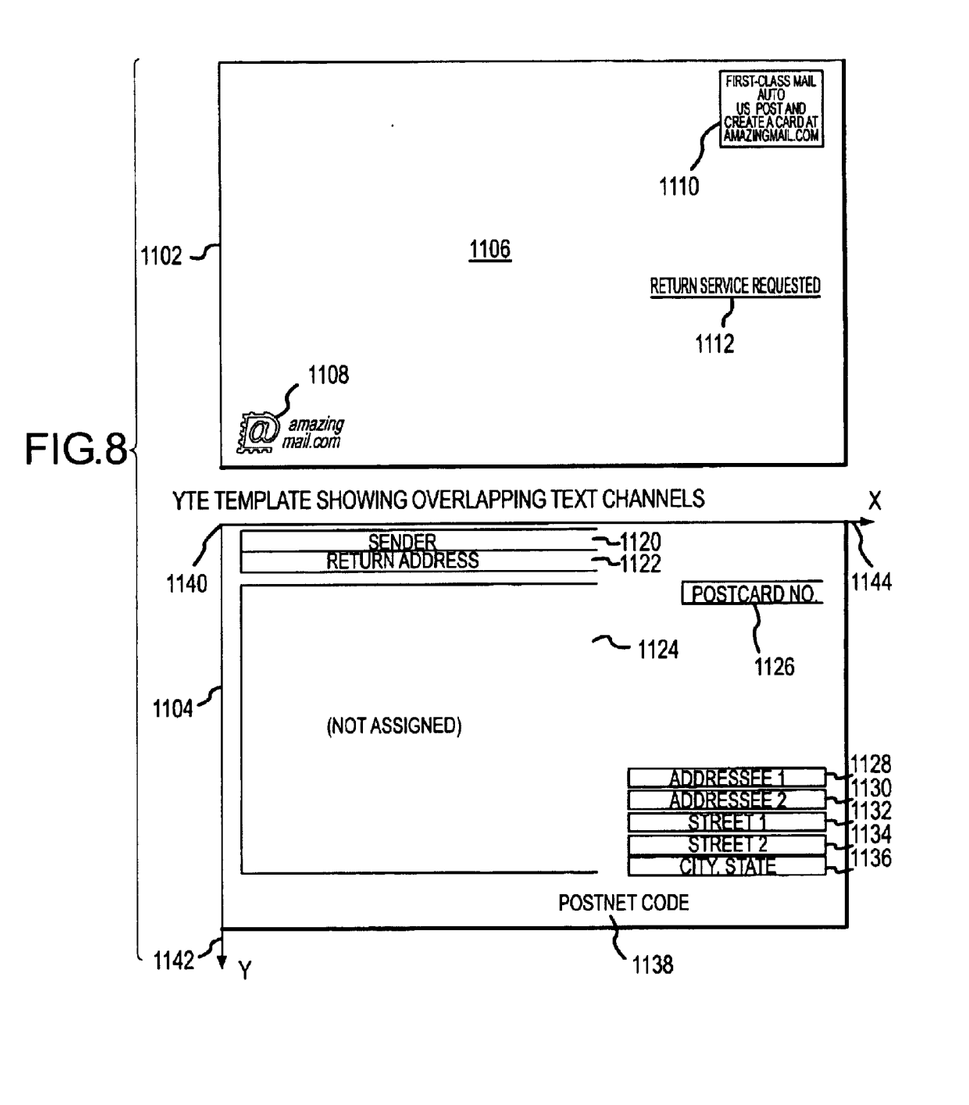
FIG. 8 shows an exemplary template design for a postcard mail item.

This table is best understood in connection with FIG. 8, which shows an example postcard template having two sides: an image side 1102, and a text side 1104. Image side 1102 preferably includes various preprinted elements such as a logo graphic 1108, a postage marking 1110, and a "return service requested" indicator 1112. Alternate embodiments may have less or more of these elements. The remaining area 1106 on image side 1102 is reserved for image data previously selected (or created) by the user. The graphic data may include any convenient file type (e.g., GIF, PICT, BMP, etc.) but is preferably saved and transferred in JPEG format.

The text side 1104 may be have a variety of configuration. In the illustrated embodiment, text side 1104 includes a variety of predefined text regions, viz.: sender name region 1120, return address region 1122, addressee1 region 1128, addressee2 region 1130, street1 region 1132, street2 region 1134, city/state/zip region 1136, postcard number region 1126, postnet code region 1138, and message text region 1124. All text channels are preferably left-justified, except postcard number, which is preferably centered.

Text side 1104 is used to display the note text previously specified (i.e., step 218 in FIG. 2), and addressee fields 1128–1136 are populated by address information determined in step 220. Postnet code 1138 is used to display the postnet code in accordance with U.S. Post Office regulations. See., e.g., the Domestic Mail Manual, cited above. Postcard number region 1126 is used to uniquely identify the mail item, and may or may not be included in any particular embodiment.

Thus, referring now to FIG. 11 and Table 1, the 'side' column refers to the side on which the entry appears (either text 1104 or 1102); the element name column is self-explanatory; the 'channel' column indicates whether the entry is part of the text or image channel; the 'X' and 'Y' columns designate the coordinate values, in millimeters, of the upper left corner of the entry with respect to the upper left corner of the postcard. That is, point 1140 is the origin, x-axis 1144 extends to the right, and y-axis 1142 extends downward. The 'width' and 'height' columns refer to the rectangular dimensions of the entry; the 'font', 'size', and 'color' columns specify the font appearance for the entry. It will be appreciated that Table 1 provides only an example of the type of template that might be implemented. Any number of fields, font sizes, text areas, etc. may be used.

In accordance with another aspect of the present invention, the image is automatically scaled and/or rotated in accordance with various factors, including, for example, the aspect ratio/dimensions of the image, and the aspect ratio/dimensions of the finished mail item. In this way, the image may be placed in at an optimal size and orientation to maximize overall image quality.

H. Printing

As mentioned above, printing facility 114 includes any combination of suitable hardware and software components configured to receive mail file information from mail service computer 110 and produce a corresponding hard-copy mail item. The mail file format is discussed above.

The components of the mail file are "RIP"ed into rasterized images for processing by the printer. Suitable software for this purpose includes, for example, Indigo JLAYOUT. This software is capable of processing JPEG images at press speed. Although the JPEG file format is described herein, it will be appreciated that other formats may be appropriate, provided the format can be quickly processed by the printer. A variety of printers are suitable for this purpose, including, for example, any of the Indigo Turbo-Stream family of printers.

It is an advantage of the present system that it is capable of parsing variable color jobs from multiple independent users into a single digital print job (i.e., on a single sheet of media). That is, while prior art systems for printing digital data necessarily printed large batches of identical mail items, the present invention can quickly and economically print mail items from different sources. The term "media" as used herein means the material, in sheet form or otherwise, upon which the image data, etc. is printed.

In one embodiment, mail items are printed at 150 dpi. It has been found that above 150 dpi, it is very difficult to notice any improvement in print quality. Thus, while the present invention certainly comprehends high resolution, 150 dpi is advantageous with respect to required bandwidth (i.e., to the servers and printers) as well as visual appearance.

Multiple mail items are preferably printed in arrays on single sheets as may be appropriate given the particular printing hardware. In a preferred embodiment, the mail items are printed in "8-on" format, that is, in a 4×2 array. Fewer or more mail items may also be printed.

I. Delivery

After printing is complete, the mail items are placed into the surface mail system 120 for delivery to the correct recipient 130. As the typical mail item is exposed to significant handling damage during processing due to sorting, movement, and the like, it is desirable to inject the mail item into the surface mail system as close to the end of the process as possible. Mail items are preferably packaged into 1000-item "packets," although a smaller or larger number of items may be used. Background information regarding the USPS may be found in the Domestic Mail Manual, described earlier.

On-line Packet Tracking

An on-line packet tracking site may be provided which allows vendors to conveniently interface with the present system in order to track a packet through production. Such a system might also provide report generation, error reporting, and performance monitoring with respect to quality and throughput time. In accordance with one aspect of the present invention, control cards are placed randomly or systematically within a mail-item packet in order to monitor quality on an ongoing basis. A control card might also be placed at the end of every packet. These cards can be addressed to a monitoring station, or can be inspected at any convenient location. Such quality indicia as alignment, CMYK calibration, and the like may be monitored.

Confirm Process

In accordance with another aspect of the present invention, information regarding the sender may be encoded on to the mail item surface in a suitable format (e.g., bar-code) that can be scanned and stored by the surface mail system 120 and subsequently used to notify the sender that the mail item is on its way. For example, a bar-code on the mail-item might include imbedded customer identification information, e.g., a five digital user ID, which can be stored in a digital file. This digital file can then be downloaded by mail service computer 110 from surface mail system 120 using, for example, file transfer protocol (FTP). The user ID can then be used to identify the sender, and the sender can be notified by e-mail or any other convenient method.

Peel-off Covers and Sponsored Mail

In accordance with another embodiment of the present invention, one side of the mail item is covered all or in part by a substantially opaque covering, for example a polymer or paper-based cover, which can be peeled off by the recipient upon delivery. In such a case, a sufficiently "weak" adhesive is preferably used such that the cover remains attached to the mail item during transit, yet can be removed by the recipient without leaving unsightly residue on the surface of the card.

Furthermore, the opaque cover itself might be printed with one or more advertisements, coupons, or the like. This advertising revenue can then be used to offset in whole or in part the cost of mailing the card. Where the sender of the mail item is a commercial enterprise such as a real-estate office, car dealership, or other endeavor that sends numerous items, the advertisements or coupons may be associated with the commercial enterprise itself Indeed, the advertisements may be based on precise demographic data derived in part from the recipient's address information.

The use of a peel-off cover has a number of advantages. First, the mail item can be protected from handling damage introduced by surface mail system 120. Second, advertising revenue may be received from third parties purchasing space on the mail item. Third, sensitive graphics or information can be concealed for privacy or other reasons. Finally, there is a certain excitement associated with the anticipation preceding the uncovering a graphic or other information.

In general, because of the advertising potential of mail pieces delivered to recipients 130, partial or complete underwriting of postage by unrelated commercial establishments is possible. In addition to printing text, graphics, address, bar code, and other indicia as may be required by surface mail system 120, the mail service computer 110 may apply advertising to the finished mail item on behalf of business that partially or fully pay the printing and postage costs. User can then enjoy free or reduced-cost mailing of their individually created mail pieces. The advertising can, in this way, be highly focused.

In order to prevent out-of-order, misplaced covers during printing, it is possible to scan the delivery-point bar-code (DPBC) on each card as it is fed into the second (peel) printing process. The DPBC is unique for every address, so the code can be fed into a database, and it could match the address with a geographically-targeted advertisement and feed the printing instructions to the printer for the specific sheet. All ads would preferably be pre-RrP'ed to prevent potential slow-downs in the printing process.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the appended claims.

We claim:

1. A method for generating and distributing mail items, said method comprising the step of:

creating, within a mail service computer, a first and a second mail file, wherein each of said first and second mail files includes recipient address information, and wherein said first mail file is generated by a first user, and said second mail file is generated by a second user, said creating step including the step of allowing said first and second users to specify the contents of said first and second mail files via a first user system and a second user system coupled to said mail service computer over a computer network;

transmitting said first and second mail files to a printing facility;

printing, on a sheet of media, a first mail item in accordance with said first mail file, printing, on said sheet of media, a second mail item in accordance with said second mail file;

separating said first and second mail items; and placing said first and second mail items into a surface mail system, wherein said first mail item is addressed in accordance with said first recipient address information, and said second mail item is addressed in accordance with said second recipient address information.

2. The method of claim 1, wherein said creating step includes the step of creating a first postcard mail file, and said printing step includes the step of printing a first two-sided postcard in accordance with said first postcard mail file.

3. The method of claim 2, wherein said first postcard mail file includes a text side data and image side data.

4. The method of claim 3, wherein said text side data includes sender name, return address, said recipient address, and a text message.

5. The method of claim 4, wherein said image side data includes at least one graphical image.

6. The method of claim 5, wherein said graphical image is a JPEG file, and said printing step includes the step of printing said first and second mail items at press speed.

7. The method of claim 6, wherein said array of mail items corresponds to a 4×2 array.

8. The method of claim 5, wherein said graphical image is a in JPEG format.

9. The method of claim 5, wherein said graphical image is automatically oriented on said mail item in accordance with the aspect ratio of said graphical image.

10. The method of claim 3, wherein said text side data is converted to a JPEG image prior to said printing step.

11. The method of claim 1, wherein said step of allowing said first and second uses to specify the contents of said first and second mail files includes the step of allowing said first and second users to specify image data, destination data, and a text message to be included in said first and second mail files.

12. The method of claim 11, wherein said image data resides on said first user system and is specified via software residing on said first user system.

13. The method of claim 12, wherein said image data is specified by allowing said first user to capture a screen image displayed on said first user system.

14. The method of claim 12, wherein said image data is specified by allowing said first user to import a graphical image file residing on said first user system.

15. The method of claim 12, wherein said image data is specified by allowing said first user to drag-and-drop an image onto said software residing on said first user system.

16. The method of claim 12, wherein said mail file includes a graphical image, and wherein said creating step includes the step of producing a lower resolution version of said graphical image for displaying said graphical image to said user.

17. The method of claim 11, wherein said image data is selected, via a web browser running on said first user system from a database associated with a web site accessible over said network.

18. The method of claim 11, wherein said image data is transferred to said mail service computer from a partner web site accessible over said network.

19. The method of claim 1, further including the step of attaching a substantially opaque peel-off cover to said first mail item prior to said placing step.

20. The method of claim 19, further including the step of printing advertisements or coupons on said peel-off cover.

21. The method of claim 20, wherein said advertisements or coupons are selected in accordance with demographic information associated with said recipient address information on said first mail item.

22. The method of claim 1, further including the step of allowing said first user to affect secure on-line address-change, said method comprising the steps of: presenting said first user with a web page prompting for address-change information; validating said address-change information; and transmitting said address-change information to a post office center if said address-change information is verified.

23. The method of claim 22, wherein said validating step includes the step of validating said address-change information using credit card information associated with said first user.

24. The method of claim 22, further including the step of sending, to one or more members of an address book associated with said first user, a notification in accordance with said address-change information.

25. The method of claim 1, further including the step of sending said first user a confirmation message when said first mail item is placed in said surface mail system.

26. The method of claim 25, wherein said step of sending a confirmation message includes the step of sending an e-mail message.

27. The method of claim 1, wherein said first user system comprises a personal computer.

28. The method of claim 1, wherein said fist user system comprises a stand-alone kiosk.

29. The method of claim 1, wherein said first user system comprises a personal data assistant.

30. The method of claim 1, wherein said creating step includes the steps of: logging in to said mail service computer; selecting said destination address; checking to determine whether said first user has a non-zero account balance; reviewing said mail item; and scheduling the delivery time of said mail item.

31. The method of claim 1, wherein said creating step further includes the step of allowing a user to selects a theme from a database of available themes, and wherein said printing step includes the step of applying said selected theme to said mail item.

32. The method of claim 1, wherein said first user selects a mail-merge option operable to fill in said recipient address in accordance with an address book associated with said fist user.

33. The method of claim 1, wherein said first user selects a mail-merge option operable to fill in said text message in accordance with an address book associated with said first user.

34. The method of claim 1, wherein said printing step includes the step of printing said first and second mail items as part of an array of mail items disposed on said single sheet of media.

35. The method of claim 1, further including the step of providing automatic address correction of said recipient address information prior to said printing step.

36. The method of claim 1, fiber including the step of sorting said mail items in accordance with delivery location.

37. The method of claim 1, wherein said placing step includes the steps of:
   placing control mail items randomly or systematically within a mail item packet, wherein said recipient address information for said control mail items corresponds to the address of a testing facility;
   testing said mail item packets in accordance with various printing quality indicia.

38. A distributed system for generating and delivering mail items, said system comprising:
   a first user system and a second user system coupled to a mail service computer over a computer network, said first user system configured to allow a first user to specify the contents of a first mail file, and said second user system configured to allow a second user to specify the contents of a second mail file;
   said mail service computer configured to store said first and second mail files, wherein each of said first and second mail files includes recipient address information;
   a printing facility coupled to said mail service computer, said printing facility configured to: receive said first and second mail files; print, on a sheet of media, said first mail item in accordance with said first mail file; print, on said sheet of media, a second mail item in accordance with said second mail file; then separate said first and second mail items, and
   a surface mail system operable to deliver said first and second mail items, wherein said first mail item is addressed in accordance with said first recipient address information, and said second mail item is addressed in accordance with said second recipient address information.

39. The method of claim 38, wherein said first and second mail files includes image data, destination data, and a text message to be included in said first and second mail files.

40. The method of claim 39, wherein said image data resides on said first user system and is specified via software residing on said first user system.

41. The method of claim 40, wherein said image data is specified by allowing said first user to capture a screen image displayed on said first user system.

42. The method of claim 40, wherein said image data is specified by allowing said first user to import a graphical image file residing on said first user system.

43. The method of claim 40, wherein said image data is specified by allowing said first user to drag-and-drop an image onto said software residing on said first user system.

44. The method of claim 39, wherein said image data is selected, via a web browser running on said first user system, from a database associated with a web site accessible over said network.

45. The method of claim 39, wherein said image data is transferred to said mail service computer from a partner web site accessible over said network.

46. The method of claim 38, wherein said mail item includes a substantially opaque peel-off cover.

47. The method of claim 46, wherein said peel-off cover includes advertisements or coupons.

48. The method of claim 38, wherein said first user system comprises a personal computer.

49. The method of claim 38, wherein said first user system comprises a stand-alone kiosk.

50. The method of claim 38, wherein said first user system comprises a personal data assistant.

51. The method of claim 38, wherein said mail service computer is configured to allow said user to: log on to said mail service computer, select said destination address; check to determine whether said first user has a non-zero account balance; review said mail item; and schedule the delivery time of said mail item.

52. The method of claim 38, wherein said mail item includes a theme selected by said first user from a database of available themes.

53. The method of claim 38, wherein said mail service computer is configured to present said first user with a mail-merge option operable to fill in said recipient address in accordance with an address book associated with said first user.

54. The method of claim 38, wherein said mail file is a postcard mail file, and said printing facility is configured to printing a two-sided postcard in accordance with said postcard mail file.

55. The method of claim 38, wherein said mail service computer is configured to provide automatic address correction of said recipient address information prior to said printing step.

56. The method of claim 38, wherein control mail items are placed randomly or systematically within a mail item packet, wherein said recipient address information for said control mail items corresponds to the address of a testing facility, and wherein said system further includes a testing facility configured to test said mail item packets in accordance with various printing quality indicia.

57. The method of claim 38, wherein said mail service computer is configured to send said first user a confirmation message when said first mail item is placed in said surface mail system.

58. A printing facility, said printing facility comprising:
a server, coupled to a network, configured to receive and store a first mail file and a second mail file transmitted over said network, wherein said first mail file is created by a first user, and said second mail file is created by a second user;
a printer coupled to server configured to print, on a sheet of media, said first mail item in accordance with said first mail file, and to print, on said sheet of media, a second mail item in accordance with said second mail file, wherein said printer is operable to print said first and second mail items at press speed.

* * * * *